(12) United States Patent
Shen et al.

(10) Patent No.: US 12,259,588 B2
(45) Date of Patent: Mar. 25, 2025

(54) OPTICAL STRUCTURE, OPTICAL COUPLING METHOD, AND PHOTONIC INTEGRATED CIRCUIT CHIP

(71) Applicant: Nanjing Guangzhiyuan Technology Co., Ltd., Nanjing (CN)

(72) Inventors: Yichen Shen, Nanjing (CN); Huaiyu Meng, Nanjing (CN); Zhan Su, Nanjing (CN); Junjie Chen, Nanjing (CN); Jianhua Wu, Nanjing (CN); Yunpeng Zhu, Nanjing (CN); Hui Chen, Nanjing (CN); Zhiquan Xue, Nanjing (CN); Ronald Gagnon, Nanjing (CN)

(73) Assignee: Nanjing Guangzhiyuan Technology Co., Ltd., Nanjing (CN)

( * ) Notice: Subject to any disclaimer, the term of this patent is extended or adjusted under 35 U.S.C. 154(b) by 195 days.

(21) Appl. No.: 17/860,118

(22) Filed: Jul. 8, 2022

(65) Prior Publication Data
US 2023/0008989 A1    Jan. 12, 2023

(30) Foreign Application Priority Data

Jul. 9, 2021   (CN) .......................... 202110777438.0

(51) Int. Cl.
*G02B 6/42*   (2006.01)
(52) U.S. Cl.
CPC ........... *G02B 6/425* (2013.01); *G02B 6/4214* (2013.01); *G02B 6/4215* (2013.01); *G02B 6/4286* (2013.01)
(58) Field of Classification Search
None
See application file for complete search history.

(56) References Cited

U.S. PATENT DOCUMENTS 6,708,300 B2    3/2004   Ko
8,916,874 B2 *  12/2014  Whitbread ............. G01M 11/33
                                                     257/E23.179

(Continued)

FOREIGN PATENT DOCUMENTS

CN         1329382       1/2002
CN       103457155      12/2013

(Continued)

OTHER PUBLICATIONS

Notification of Office Action and Search Report Dated Feb. 1, 2023 From the State Intellectual Property Office of the People's Republic of China Re. Application No. 202110777438.0. (12 Pages).

(Continued)

*Primary Examiner* — Charlie Y Peng

(57) ABSTRACT

Embodiments of the present invention provide an optical structure, an optical coupling method, and a photonic integrated circuit chip. The optical structure includes: two optical coupling structures with different structures, that is, a first optical coupling structure and a second optical coupling structure. The first optical coupling structure includes a first optical transmission structure, and a first coupling port and a second coupling port both connected to the first optical transmission structure. The second optical coupling structure includes a second optical transmission structure, and a third coupling port and a photoelectric conversion structure both connected to the second optical transmission structure. When optical signals are provided in different methods or optical coupling is performed in different scenarios, optical signal coupling can be realized by using optical coupling structures of different structures in the abovementioned optical structure.

13 Claims, 8 Drawing Sheets

(56) References Cited

U.S. PATENT DOCUMENTS

| | | | | |
|---|---|---|---|---|
| 9,335,480 | B1* | 5/2016 | Celo | G02B 6/3656 |
| 9,453,723 | B1* | 9/2016 | LeMaitre | G01B 11/27 |
| 9,520,944 | B2 | 12/2016 | Huang | |
| 11,600,512 | B2 | 3/2023 | Yoon | |
| 2001/0053265 | A1 | 12/2001 | Yamashita | |
| 2020/0124792 | A1* | 4/2020 | Cho | H01L 27/144 |
| 2020/0295825 | A1* | 9/2020 | Sugiyama | H04B 10/40 |
| 2020/0310054 | A1 | 10/2020 | Epitaux | |
| 2021/0381907 | A1* | 12/2021 | Xie | G02B 6/125 |
| 2024/0184046 | A1 | 6/2024 | Wang et al. | |

FOREIGN PATENT DOCUMENTS

| | | |
|---|---|---|
| CN | 107615121 | 1/2018 |
| CN | 207123493 | 3/2018 |
| CN | 109073844 | 12/2018 |
| CN | 110208916 | 9/2019 |
| CN | 110678971 | 1/2020 |
| CN | 112180505 | 1/2021 |
| CN | 112904501 | 6/2021 |
| SG | 143968 | 7/2008 |
| TW | 201619649 | 6/2016 |

OTHER PUBLICATIONS

Notification Office Action and Search Report Dated Aug. 15, 2023 From the China National Intellectual Property Administration Re. Application No. 202110777438.0 and Its Translation Into English. (23 Pages).

Notification Office Action and Search Report Dated Jan. 15, 2024 From the China National Intellectual Property Administration Re. Application No. 202110777438.0 and Its Translation Into English. (23 Pages).

Office Action and Search Report Dated Aug. 23, 2023 From the Intellectual Property Office, Ministry of Economic Affairs of the Republic of Taiwan, R.O.C. Rc. Application No. 111125833 and Its Translation Into English. (20 Pages).

* cited by examiner (1)

(2)

(1)

(2)

OPTICAL STRUCTURE, OPTICAL COUPLING METHOD, AND PHOTONIC INTEGRATED CIRCUIT CHIP

RELATED APPLICATIONS

This application claims priority of Chinese Patent Application No. 202110777438.0 filed on Jul. 9, 2021, and titled "OPTICAL STRUCTURE, OPTICAL COUPLING METHOD, AND PHOTONIC INTEGRATED CIRCUIT CHIP", which is incorporated by reference in its entirety in the present application.

FIELD AND BACKGROUND OF THE INVENTION

The present invention relates to a field of photonic chip technology, and more specifically, to an optical structure, an optical coupling method, and a photonic integrated circuit chip.

A photonic integrated circuit (PIC) chip usually integrates one or more elements such as a grating coupler, an optical waveguide, an optical modulator, and a photoelectric converter, etc., which can realize at least one function of input, transmission, processing, and output of light, and can be applied to fields such as communication, sensing applications, and photonic computing, etc.

Common sources of light input in photonic chips are a light source (e.g., a laser) or an optical fiber. The photonic chips are usually provided with a plurality of optical coupling ports. In practice, for different stages of a PIC chip life cycle, such as a production stage, a packaging stage, a stage for leaving factory for use, etc., optical signal coupling is a very important process.

SUMMARY OF THE INVENTION

In view of this, embodiments of the present invention provide an optical structure, an optical coupling method, and a photonic integrated circuit chip, so as to realize optical signal coupling.

In a first aspect, an embodiment of the present invention provides an optical structure, including: a first optical coupling structure and a second optical coupling structure.

The first optical coupling structure includes a first optical transmission structure, and a first coupling port and a second coupling port both connected to the first optical transmission structure.

The second optical coupling structure includes a second optical transmission structure, and a third coupling port and a photoelectric conversion structure both connected to the second optical transmission structure.

In a second aspect, an embodiment of the present invention provides an optical coupling method, which provides the optical structure as described in the first aspect. The method includes:
  inputting an optical signal by the first coupling port;
  transmitting the optical signal to the second coupling port by the first optical transmission structure; and
  outputting the optical signal from the second coupling port;
  and/or;
  inputting the optical signal to the third coupling port;
  transmitting the optical signal by the second optical transmission structure; and
  detecting a signal intensity of the optical signal output by the second optical transmission structure by the photoelectric conversion structure.

In a third aspect, an embodiment of the present invention provides a photonic integrated circuit chip. The photonic integrated circuit chip includes a first optical coupling structure and a second optical coupling structure. The first optical coupling structure includes a first optical transmission structure, and a first coupling port and a second coupling port both connected to the first optical transmission structure. The second optical coupling structure includes a second optical transmission structure, and a third coupling port and a photoelectric conversion structure both connected to the second optical transmission structure.

In practical applications, an optical signal coupled into an optical structure can be provided in different methods, for example, being provided through an optical fiber array or a laser light source. When the above-mentioned optical structure is integrated into the PIC chip mentioned in Background, the different methods of providing the optical signal can also be applied to different stages of a PIC chip production and application. For example, in a production stage of the PIC chip, the optical fiber array can usually be used to provide the optical signal for optical coupling, so as to perform characteristic testing, etc. In a packaging stage or a practical application stage of the PIC chip, in addition to providing the light through an optical fiber, sometimes the laser light source is required to provide the optical signal for the optical coupling.

The optical structure provided by the embodiment of the present invention includes two optical coupling structures with different structures, that is, a first optical coupling structure and a second optical coupling structure. Specifically, the first optical coupling structure includes a first optical transmission structure, and a first coupling port and a second coupling port both connected to the first optical transmission structure. The second optical coupling structure includes a second optical transmission structure, and a third coupling port and a photoelectric conversion structure both connected to the second optical transmission structure. In the above-mentioned optical structure, different optical coupling structures are suitable for different methods of providing an optical signal. Therefore, when using different methods to provide the optical signal, optical signal coupling can be realized by using the above-mentioned optical structure.

BRIEF DESCRIPTION OF THE SEVERAL VIEWS OF THE DRAWINGS

In order to illustrate technical solutions in embodiments of the present invention or in the prior art more clearly, the accompanying drawings that need to be used in the description of the embodiments or the prior art will be briefly introduced below. Obviously, the accompanying drawings in the following description are merely some embodiments of the present invention. For those skilled in the art, other drawings can also be obtained based on these drawings without any creative effort.

DESCRIPTION OF SPECIFIC EMBODIMENTS OF THE INVENTION

Figure 1:
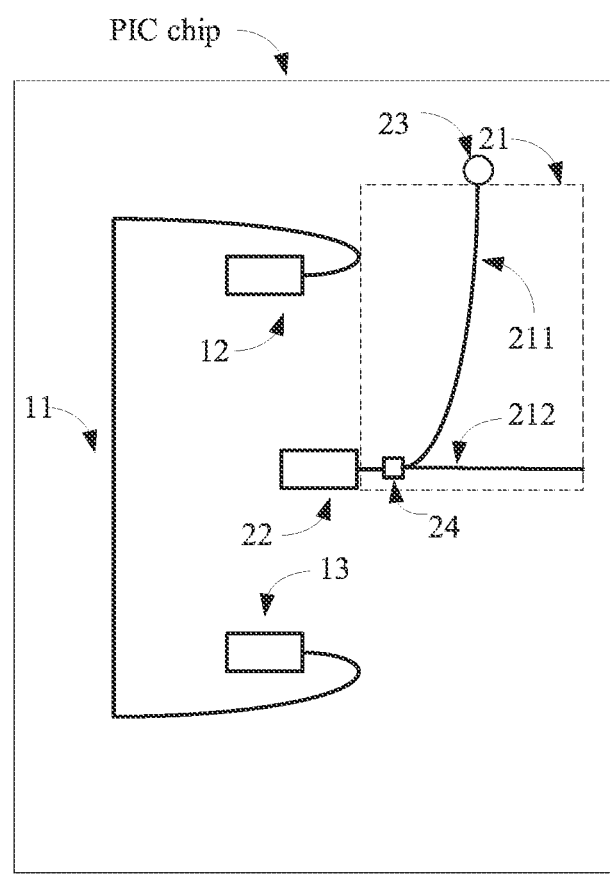
FIG. 1 is a schematic diagram of an optical structure provided by an embodiment of the present invention.

In order to make purposes, technical solutions, and advantages of embodiments of the present invention clearer, the technical solutions in the embodiments of the present invention will be described clearly and completely below in combination with the accompanying drawings in the embodiments of the present invention. Obviously, the described embodiments are part of the embodiments of the present invention, but not all of the embodiments. Based on the embodiments of the present invention, all other embodiments, which are obtained by those skilled in the art without creative efforts, shall fall within the protection scope of the present invention.

The terms used in the embodiments of the present invention are only for the purpose of describing specific embodiments and are not intended to limit the present invention. The singular forms "a", "an", and "the" as used in the embodiments of the present invention are intended to include plural forms as well, unless the context clearly dictates otherwise, and "a plurality" generally includes at least two types but does not exclude a case of including at least one type.

It should be understood that the term "and/or" used herein is only an association relationship for describing associated objects, indicating that there may be three relationships. For example, A and/or B may indicate three cases that: A exists alone, A and B exist at the same time, and B exists alone. In addition, the character "/" herein generally indicates that related objects before and after the character have an "or" relationship.

Depending on the context, the words "if" as used herein may be interpreted as "at the time of . . . ", "when . . . ", "in response to determining . . . ", or "in response to identifying . . . ". Similarly, the phrases "if it is determined" or "if a (stated condition or event) is identified" can be interpreted as "when . . . is determined", "in response to determining", "when a (stated condition or event) is identified", or "in response to identifying a (stated condition or event)".

It should also be noted that the terms "comprise", "include" or any other variation thereof are intended to encompass a non-exclusive inclusion, such that a commodity or system comprising a list of elements includes not only those elements, but also other elements both not explicitly listed or both inherent to the commodity or system. Without further limitation, an element defined by the phrase "comprise one . . . " does not preclude presence of additional identical elements in the commodity or system that includes the elements.

The term "connection", without special limitation, may include direct connection and indirect connection.

Some embodiments of the present invention will be described in detail in combination with the accompanying drawings hereinafter. The following embodiments and features in the embodiments may be combined with each other under circumstances that there is no conflict between the embodiments. In addition, an order of steps in the following method embodiments is only an example and is not strictly limited.

FIG. 1 is a schematic diagram of an optical structure provided by an embodiment of the present invention. As shown in FIG. 1, the structure includes: a first optical coupling structure and a second optical coupling structure.

The first optical coupling structure includes a first optical transmission structure 11, and a first coupling port 12 and a second coupling port 13 both connected to the first optical transmission structure 11. The second optical coupling structure includes a second optical transmission structure 21, and a third coupling port 22 and a photoelectric conversion structure 23 both connected to the second optical transmission structure 21.

Optionally, each coupling port in the optical structure may include a grating coupler, and each optical transmission structure may include a light-guiding medium such as an optical waveguide. Optionally, the photoelectric conversion structure 23 may include a photodetector. Optionally, the optical structure shown in FIG. 1 can be integrated into a photonic integrated circuit (PIC) chip.

An effect of each structure in the optical structure can be described as follows.

The first coupling port 12 in the first optical coupling structure is used to input an optical signal, that is, to couple the optical signal. The first optical transmission structure 11 is used to transmit the optical signal input into the first coupling port 12 to the second coupling port 13, and the second coupling port 13 outputs the optical signal.

Optionally, a detection device externally connected to the optical structure can also be used to detect a signal intensity of the optical signal output by the second coupling port 13. If the signal intensity of the optical signal is greater than or equal to a preset threshold, an optical coupling accuracy of the first coupling port 12 and the second coupling port 13 is relatively high. Else, the optical coupling accuracy is relatively low.

Optionally, in practice, the optical signal can also be input from the second coupling port 13 included in the first optical coupling structure, and then output from the first coupling port 12. At this time, according to a signal intensity of the output optical signal, the optical coupling accuracy of the first coupling port 12 and the second coupling port 13 can be determined, which can be used for active alignment.

The third coupling port 22 in the second optical coupling structure is used to input an optical signal, and the second optical transmission structure 21 is used to transmit the optical signal input by the third coupling port 22. The photoelectric conversion structure 23 is used to detect a signal intensity of the optical signal output by the second optical transmission structure 21. If the signal intensity of the optical signal is detected to be greater than or equal to the preset threshold, it indicates that most of the optical signal is coupled into the third coupling port 22, and an optical coupling effect of the third coupling port 22 is good. That is, the third coupling port 22 has a relatively high optical coupling accuracy. Else, it indicates that the optical coupling accuracy of the third coupling port 22 is relatively low.

Optionally, the optical signal input into a coupling port can be output by a laser light source or other optical signal generation devices. Optionally, an inputting method of the optical signal, i.e., a method of providing the optical signal, may include that: an optical signal generated by the laser light source may be directly input into the coupling port, or a laser signal may be reflected by means of a prism so as to make the optical signal be input into the coupling port. The optical signal can also be input into the coupling port by means of an optical fiber array, etc.

In practice, optionally, for different optical coupling structures, the coupling port(s) included are usually matched well with a corresponding optical signal inputting method. For example, based on the optical structure shown in FIG. 1, the first coupling port 12 in the first optical coupling structure can realize input of the optical signal by means of the optical fiber array. Specifically, the first coupling port 12 and the second coupling port 13 can be respectively connected to different optical fibers in the optical fiber array. The optical signal transmitted in an optical fiber connected to the first coupling port 12 will be input from the first coupling port 12, and then output through the first optical transmission structure 11, the second coupling port 13, and an optical fiber connected to the second coupling port 13.

As another example, the third coupling port 22 in the second optical coupling structure can directly input the optical signal generated by the laser light source, or input the optical signal by means of the prism. In such case, a position of the light source can also be continuously adjusted to align the light source with the third coupling port 22 to ensure the optical coupling accuracy of the third coupling port 22, which can be used for the active alignment.

In addition to the above-mentioned method(s), optionally, the first coupling port 12 can also input the optical signal by means of the light source and the prism. The third coupling port 22 can also input the optical signal by means of the optical fiber array. Therefore, the third coupling port 22 can be used not only for coupling and alignment of the optical fiber during wafer-level testing, but also for coupling and alignment of the light source such as lasers, etc. That is, the third coupling port 22 can be used for coupling with the optical fiber and also for coupling with the light source. The above-mentioned relationship between the coupling port and the optical signal inputting method is only a schematic representation and is not limited in the invention.

The optical structure in this embodiment includes two optical coupling structures with different structures, that is, a first optical coupling structure and a second optical coupling structure. Specifically, the first optical coupling structure includes a first optical transmission structure 11, and a first coupling port 12 and a second coupling port 13 both connected to the first optical transmission structure 11. The second optical coupling structure includes a second optical transmission structure 21, and a third coupling port 22 and a photoelectric conversion structure 23 both connected to the second optical transmission structure 21. In the above-mentioned optical structure, different optical coupling structures are suitable for different optical signal inputting methods. Therefore, when the optical signals are provided in different methods, optical signal coupling can be realized by using the above-mentioned optical structure.

Figure 2A:
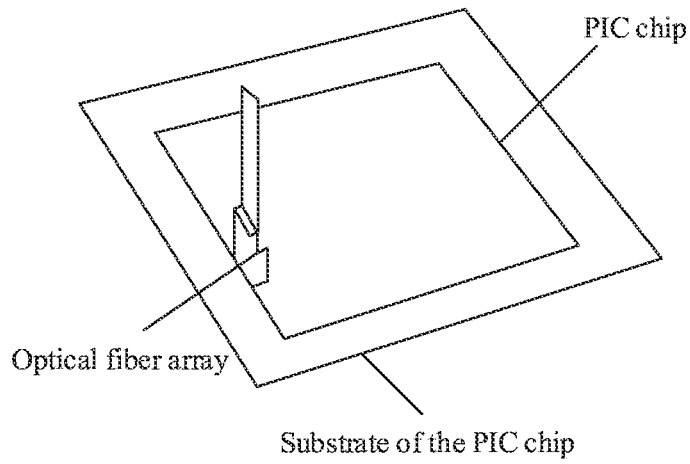
FIG. 2a is a schematic diagram of an optical signal coupling mode corresponding to the optical structure provided by the embodiment shown in FIG. 1.
Figure 2A:
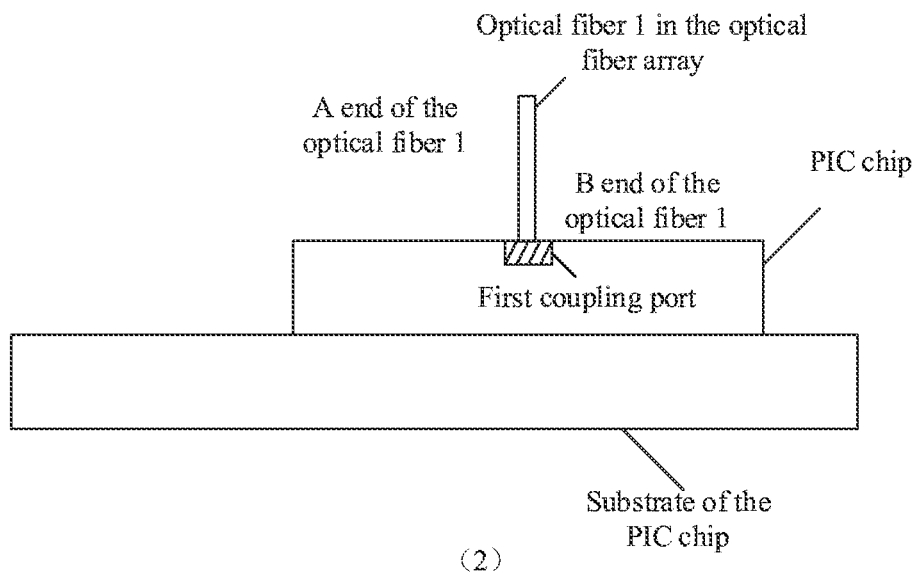

The above-mentioned embodiments disclose that the optical signal can be input into the first coupling port 12 by means of the optical fiber array. In combination with FIG. 2a, a transmission process of the optical signal in the first optical coupling structure can be described as that: the optical signal is transmitted from an A end of an optical fiber 1 in the optical fiber array to a B end of the optical fiber 1, and then input into the first coupling port 12. After that, the optical signal is transmitted to the second coupling port 13 along the first optical transmission structure 11, and finally output from an A end of another optical in the optical fiber array connected to the second coupling port 13. Since the first coupling port 12 and the second coupling port 13 can be arranged on the PIC chip in parallel, the second coupling port 13 and the optical fiber array connected to the second coupling port 13 are not shown in FIG. 2a.

Illustratively, there may be 4, 8, 22, 16, 32, etc., optical fibers in the optical fiber array, and a distance between adjacent optical fibers may be 127 microns.

In addition, in practice, for the PIC chip in a production stage, the signal intensity of the optical signal input from the first coupling port 12 and output from the second coupling port 13 is detected, which can realize detecting quality of each PIC chip on a wafer.

Figure 2B:
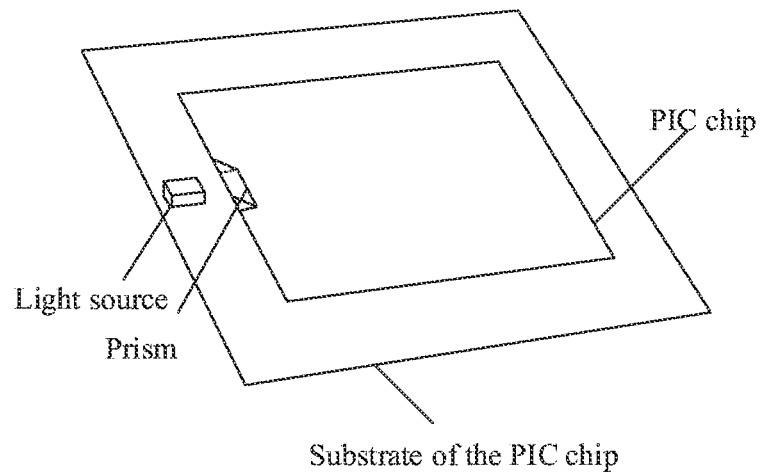
FIG. 2b is a schematic diagram of another optical signal coupling mode corresponding to the optical structure provided by the embodiment shown in FIG. 1.
Figure 2B:
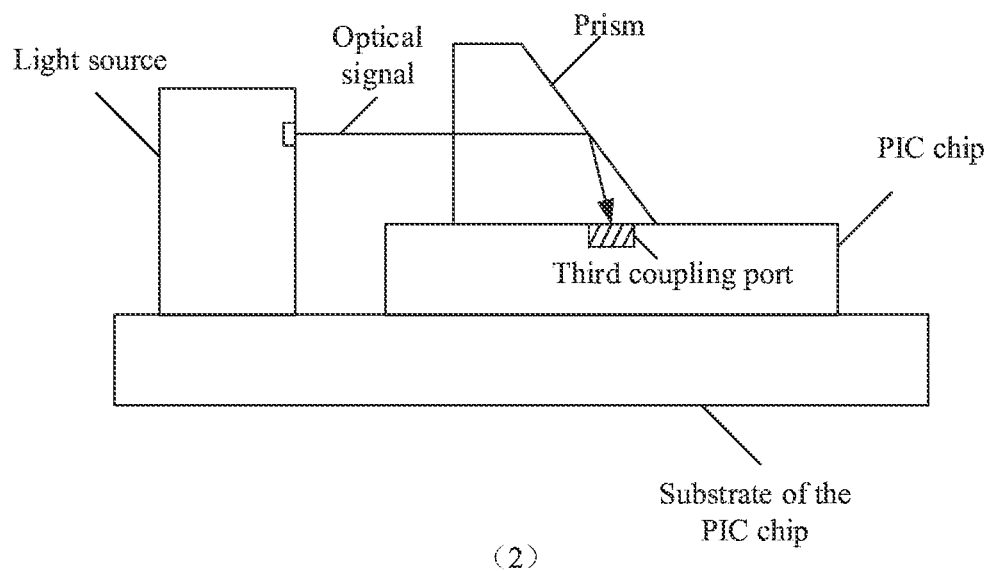

The above-mentioned embodiment discloses that the light source and the prism can be used to input the optical signal into the third coupling port 22, and this process can be understood in combination with FIG. 2b. However, it should be noted that a positional relationship among the third coupling port 22, the light source, and the prism shown in FIG. 2b is only an example, and the present invention does not limit the positional relationship among them, as long as the optical signal generated by the light source may be incident to the third coupling port 22 within a preset angle after being reflected by the prism.

In addition, in practice, for the PIC chip that has been packaged and put into use, the third coupling port 22 can be used for the optical signal coupling. To ensure the accuracy of the optical coupling, the position of the light source can be continuously adjusted to align the light source with the third coupling port 22, thereby achieving the active alignment.

Figure 3:
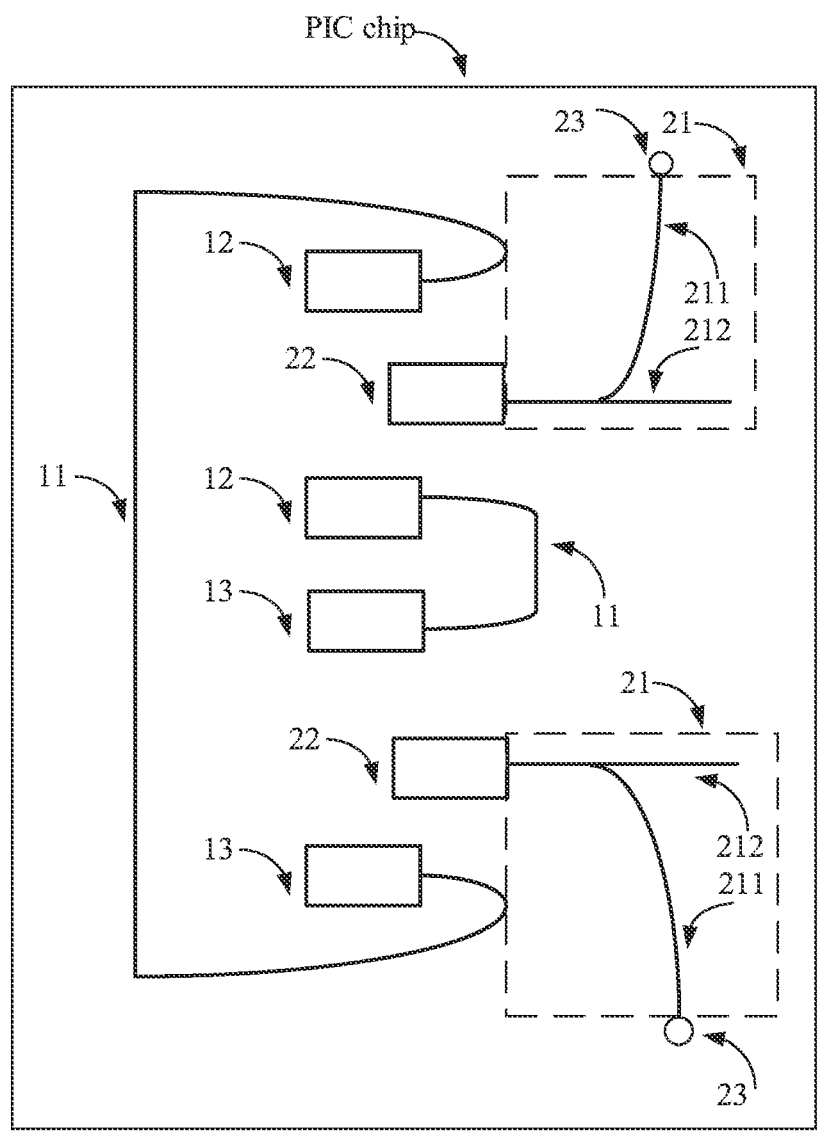
FIG. 3 is a schematic diagram of another optical structure provided by an embodiment of the present invention.

Optionally, as shown in the optical structure shown in FIG. 1, the first coupling port 12 and the second coupling port 13 included in the first optical coupling structure may be disposed at two ends of the first optical transmission structure 11, respectively. The third coupling port 22 in the second optical coupling structure is located at a first end of the second optical transmission structure 21, and the photoelectric conversion structure 23 is located at a second end of the second optical transmission structure 21. Only one first optical coupling structure and one second optical coupling structure are shown in the optical structure shown in FIG. 1. In practice, both the first optical coupling structure and the second optical coupling structure may be a plurality, as shown in FIG. 3.

Figure 4:
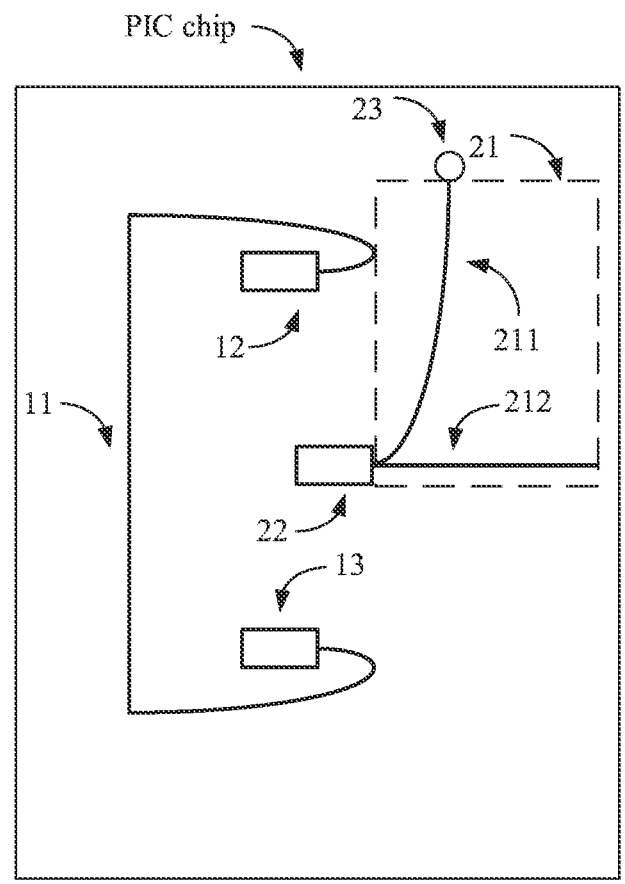
FIG. 4 is a schematic diagram of yet another optical structure provided by an embodiment of the present invention.

The second optical transmission structure 21 in the optical structure shown in FIG. 1 may specifically include a first substructure 211 and a second substructure 212 (marked with dotted lines). The first substructure 211 is connected to the photoelectric conversion structure 23. Optionally, in FIG. 1, the second optical transmission structure 21 is Y-shaped. Optionally, as shown in FIG. 4, the second optical transmission structure 21 may also be V-shaped.

The first substructure 211 is used to transmit a first optical splitting signal of the optical signal. The photoelectric conversion structure 23 is used to detect a signal intensity of the first optical splitting signal. The signal intensity can reflect the optical coupling accuracy of the third coupling port 22. When the optical structure shown in FIG. 1 is integrated on the PIC chip, the second substructure 212 can be connected to other structures in the PIC chip (the other structures are not shown in FIG. 1), such as an optical modulator, an optical beam splitter, etc., the second substructure 212 is used to transmit a second optical splitting signal of the optical signal to other structures on the PIC chip, so as to ensure a normal operation of the PIC chip.

Optionally, a power splitter 24 connected to the third coupling port 22 can also be used to perform optical splitting processing on the optical signal to obtain the above-mentioned first optical splitting signal and second optical splitting signal. Optionally, the power splitter 24 may be a waveguide optical splitter, a free-space beam splitter, or the like.

In practice, a power ratio of the first optical splitting signal to the second optical splitting signal can also be set according to actual situations. And since the second optical splitting signal is used to ensure the normal operation of the PIC chip, a power of the second optical splitting signal is usually set to be greater than a power of the first optical splitting signal. Illustratively, the first optical splitting signal has a power of 5% to 15% of the optical signal, and the second optical splitting signal has a remainder of the power of the optical signal, that is, 85% to 95% of the power. More specifically, the first optical splitting signal has for example 15% of the power of the optical signal, and the second optical splitting signal has 85% of the power of the optical signal.

In this embodiment, for the optical structure that is packaged and practically used, the optical coupling can be realized by means of the second optical coupling structure. Moreover, due to the first substructure 211 and the second substructure 212 included in the second optical transmission structure 21 of the second optical structure, the second optical coupling structure can be used for the optical coupling, the active alignment, and also for transmitting light to other devices or optical structures.

Figure 5:
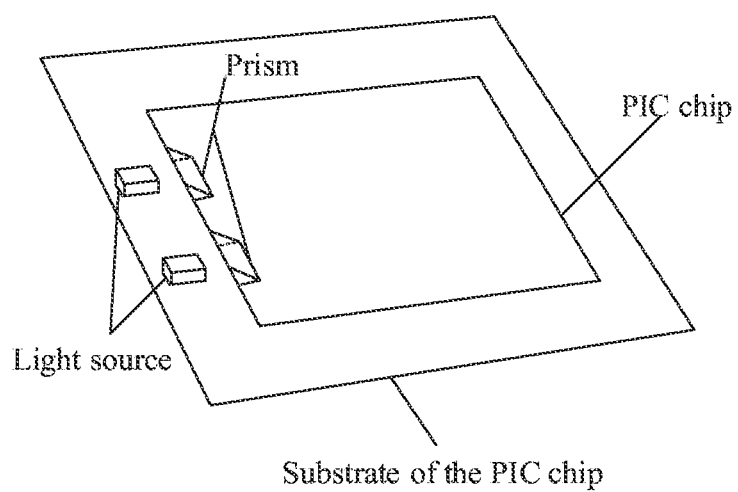
FIG. 5 is a schematic diagram of a positional relationship between different coupling ports and a light source in the optical structure provided by an embodiment of the present invention.

According to an embodiment shown in FIG. 3 and FIG. 5, the optical signal can be input into the third coupling port 22 by means of the light source and the prism, and optionally, the light source can be in one-to-one correspondence with the third coupling port 22, that is, a number of the light source and a number of the third coupling port 22 are same. Because the light source or the light source assembly itself has a certain volume or other reasons, the optical signal provided by the light source may not be able to achieve a relatively short distance of the optical signal provided by the optical fiber, and there will be a certain distance between adjacent optical signals.

As shown in FIG. 3, illustratively, the optical structure may include a plurality of second optical coupling structures, and the plurality of second optical coupling structures may specifically include a first second optical coupling structure and a second second optical coupling structure. A distance between the third coupling ports 22 respectively included in the first second optical coupling structure and the second second optical coupling structure is equal to a preset distance. Each second optical coupling structure corresponds one-to-one to the light source, that is, each third optical coupling port 22 corresponds one-to-one to the light source. The above-mentioned preset distance is actually a distance between the light sources corresponding to the third coupling ports 22. The distance of the light source is defined as a distance between light rays (optical signals) output by the light source.

Based on the above-mentioned distance relationship, it can be ensured that the third coupling port 22 in the second optical coupling structure can be aligned with its corresponding light source. In FIG. 5, the third coupling port 22 on the PIC chip is located under the prism, that is, the third coupling port 22 is blocked by the prism, and the positional relationship between the light source and the prism in FIG. 5 can also be considered as the positional relationship between the third coupling port 22 and the light source.

In this embodiment, the optical signal can be input into the third coupling ports 22 respectively included in each of a plurality of optical structures by means of the light source and the prism. At this time, a distance between a plurality of third coupling ports 22 is a distance between the light sources corresponding to the plurality of third coupling ports 22, so that the third coupling port 22 is aligned with its corresponding light source.

Optionally, based on the optical structures shown in FIG. 1, FIG. 3, or FIG. 4, the optical signal can also be input into the first coupling port 12 and/or the second coupling port 13 in the first optical coupling structure by means of the optical fiber array. At this time, since the input of the optical signal does not directly use the light source, therefore, setting of the distance between the two coupling ports in the first optical coupling structure may not be limited by the light source, and is more flexible. However, since the distance between the optical fibers in the optical fiber array is usually relatively small, a distance between the first coupling port 12 and the second coupling port 13 in the first optical coupling structure is also usually relatively small.

Summing up the embodiments shown in the above figures, the setting of the positional relationship between the coupling ports in the optical structure may be related to a method of inputting the optical signal into the coupling port.

For the third coupling ports 22 respectively included in each of the plurality of second optical coupling structures, if the optical signal is generated by the light source and input into the third coupling port 22 by means of the prism, the setting of the distance between the plurality of third coupling ports 22 need to take the distance between the light sources into consideration. For example, the distance between the third coupling ports 22 respectively included in each of the plurality of second optical coupling structures is equal to the distance between the light sources corresponding to the third coupling ports 22 respectively.

If the optical signal is input into the third coupling port 22 by means of the optical fiber array, since the distance between the optical fibers in the optical fiber array is relatively small, the distance between adjacent third coupling ports 22 can also be set relatively small.

For the first coupling port 12 and/or the second coupling port 13 in a same first optical coupling structure, if the optical signal is input into the first coupling port 12 and/or the second coupling port 13 by means of the optical fiber array, the setting of the distance between the first coupling port 12 and the second coupling port 13 is more flexible. But in view of the distance between the optical fibers in the optical fiber array, the distance between the first coupling port 12 and the second coupling port 13 is usually set to be relatively small.

Figure 6:
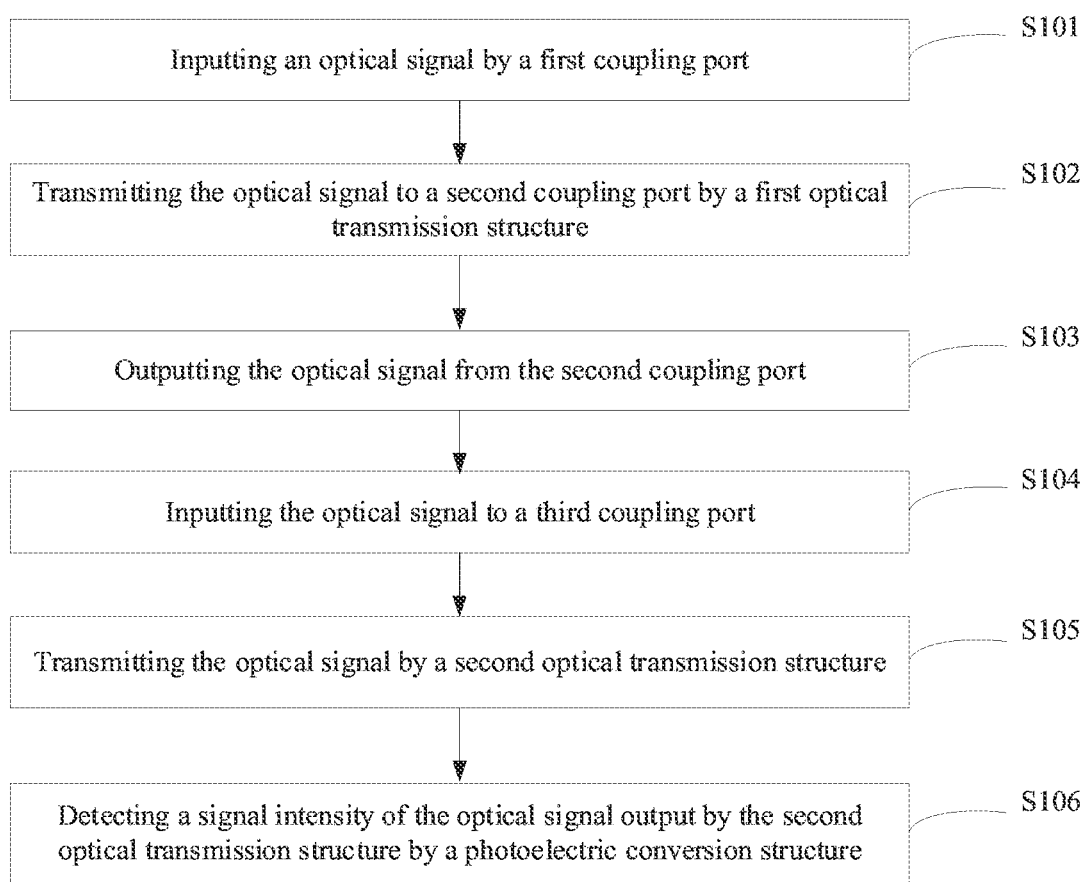
FIG. 6 is a flowchart of an optical coupling method provided by an embodiment of the present invention.

FIG. 6 is a flowchart of an optical coupling method provided by an embodiment of the present invention. The optical coupling method provided by the embodiment of the present invention may be implemented by the optical structures provided in the embodiments shown in FIGS. 1 to 5. The optical structure includes the first optical coupling structure and the second optical coupling structure. The first optical coupling structure includes the first optical transmission structure 11, and the first coupling port 12 and the second coupling port 13 both connected to the first optical transmission structure 11. The second optical coupling structure includes the second optical transmission structure 21, and the third coupling port 22 and the photoelectric conversion structure 23 both connected to the second optical transmission structure 21. The optical coupling method is not limited to FIG. 6. Illustratively, the optical coupling method may specifically include following steps S101-S103.

S101, inputting an optical signal by the first coupling port;

S102, transmitting the optical signal to the second coupling port by the first optical transmission structure; and S103, outputting the optical signal from the second coupling port.

And/or, the optical coupling method may also include following steps S104-S106:

S104, inputting the optical signal to the third coupling port;

S105, transmitting the optical signal by the second optical transmission structure; and S106, detecting a signal intensity of the optical signal output by the second optical transmission structure by the photoelectric conversion structure.

It should be noted that, in practice, the first optical coupling structure and the second optical coupling structure may perform optical signal coupling simultaneously or non-simultaneously. Therefore, there is no strict timing sequence restriction among the above steps.

Based on the embodiments shown in FIGS. 1 to 5, a process of optical coupling performed by the first optical coupling structure can be described as that: the optical signal is input into the first coupling port 12, then transmitted by the first optical transmission structure 11 to the second coupling port 13, and finally output by the second coupling port 13. Optionally, the signal intensity of the optical signal output by the second coupling port 13 may also be detected by the external detection device, so as to determine the optical coupling accuracy of the first coupling port 12 and the second coupling port 13.

A process of optical coupling performed by the second optical coupling structure can be described as that: the optical signal is input into the third coupling port 22, and then transmitted by the second optical transmission structure 21, and the photoelectric conversion structure 23 detects the signal intensity of the optical signal output by the second optical transmission structure 21.

Optionally, in the optical structure, a number of the first optical coupling structure and a number of the second optical coupling structure may be at least one, as shown in the embodiments illustrated in FIG. 1 or FIG. 3.

Optionally, the first coupling port 12, the second coupling port 13, and the third coupling port 22 in the optical structure include a grating coupler, and the first optical transmission structure 11 and the second optical transmission structure 21 include a light-guide medium.

Optionally, the second optical transmission structure 21 in the second optical coupling structure specifically further includes the first substructure 211 and the second substructure 212. The first substructure 211 is used to transmit the first optical splitting signal of the optical signal, and the second substructure 212 is used to transmit the second optical splitting signal of the optical signal. Optionally, the third coupling port 22 in the second optical coupling structure may also be connected to the power splitter 24, which is used to perform optical splitting processing on the optical signal to obtain the above-mentioned first optical splitting signal and second optical splitting signal.

Optionally, the coupling ports included in different optical coupling structures in the optical structure may be suitable for different optical signal inputting methods. For example, by means of the light source and the prism, an optical signal output by the light source may be input into the third coupling port 22 in the second optical structure. As another example, by means of the optical fiber array, the optical signal may be input into the first coupling port 12 and/or the second coupling port 13 in the first optical coupling structure.

Setting of the positional relationship between the optical coupling ports may also consider the above-mentioned optical signal inputting method. For example, the optical structure shown in FIG. 3 includes a plurality of second optical coupling structures. For the first second optical coupling structure and the second second optical coupling structure included in the plurality of second optical coupling structure, the distance between the third coupling ports 22 respectively included in the first second optical coupling structure and the second second optical coupling structure is equal to the preset distance. The preset distance may be the distance between light sources corresponding to the third coupling ports 22. As another example, since the distance between optical fibers in the optical fiber array is relatively small, the distance between the first coupling port 12 and the second coupling port 13 in the same first optical coupling structure can be set relatively small.

Optionally, the first coupling port 12 and/or the second coupling port 13 in the first optical coupling structure can also input the optical signal by means of the optical fiber array.

In this embodiment, based on the optical structures shown in FIG. 1 to FIG. 5, different optical coupling structures are suitable for different optical signal inputting methods. Therefore, when using different methods to provide the optical signal, the above-mentioned optical structure is used to realize optical signal coupling. In addition, for content not described in detail in this embodiment and technical effects that can be achieved, reference may be made to relevant descriptions in the above-mentioned embodiments, and details are not repeated here.

Figure 7:
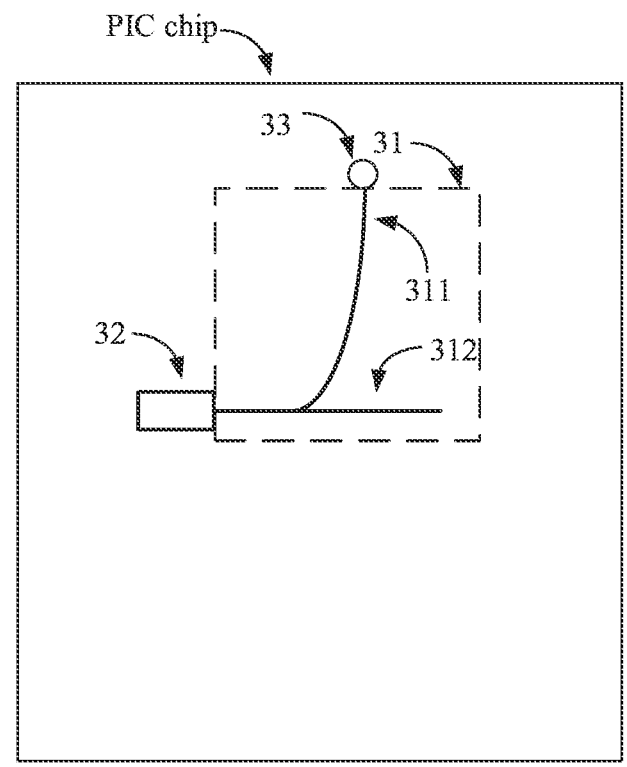
FIG. 7 is a schematic diagram of yet another optical structure provided by an embodiment of the present invention.

FIG. 7 is a schematic diagram of yet another optical structure provided by an embodiment of the present invention. As shown in FIG. 7, the structure includes: an optical transmission structure 31, and a coupling port 32 and a photoelectric conversion structure 33 both connected to the optical transmission structure 31. The optical transmission structure 31 includes a first substructure 311 and a second substructure 312. The first substructure 311 is connected to the photoelectric conversion structure 33.

Optionally, after an optical signal is input into the coupling port 32, optical splitting processing may also be performed to obtain a first optical splitting signal and a second optical splitting signal. The first substructure 311 is used to transmit the first optical splitting signal, the second substructure 312 is used to transmit the second optical splitting signal, and the photoelectric conversion structure 33 is used to detect a signal intensity of the first optical splitting signal.

Optionally, the optical structure shown in FIG. 7 can be integrated on a PIC chip, and then the second substructure 312 can also be connected to other structures in the PIC chip (the other structures are not shown in FIG. 7). The second optical splitting signal can transmit light through the second substructure 312 to other structures in the PIC chip, such as an optical modulator, an optical beam splitter, etc. Optionally, the optical transmission structure in the optical structure may be Y-shape as shown in FIG. 7, or the optical transmission structure in the optical structure may be V-shape as shown in FIG. 4.

Optionally, the optical splitting processing on the optical signal may be implemented by a power splitter connected to the coupling port 32, so as to obtain the above-mentioned first optical splitting signal and second optical splitting signal.

In practice, a plurality of optical structures as shown in FIG. 7 may be integrated on the PIC chip. Optionally, the optical signal may be input into the coupling port 32 by means of a light source and a prism, or the optical signal may be input into the coupling port 32 included in each optical structure by means of an optical fiber array.

When the optical signal is input into the coupling port 32 by means of the light source and the prism, and the light source and the coupling port 32 included in the optical structure can be in one-to-one correspondence. For a first optical structure and a second optical structure included in the plurality of optical structures in the PIC chip, a distance between the coupling ports 32 respectively included in the first optical structure and the second optical structure is equal to a preset distance. The preset distance is a distance between light sources corresponding to the coupling ports 32 included in the two optical structures, so as to align the coupling port 32 with the light source, thereby ensuring an optical coupling accuracy of the coupling port 32. A positional relationship between the coupling port 32 and the light source may be understood in combination with the embodiments as shown in FIG. 5.

In this embodiment, the optical structure includes the optical transmission structure 31, and the coupling port 32 and the photoelectric conversion structure 33 both connected to the optical transmission structure 31. The optical transmission structure 31 specifically includes the first substructure 311 and the second substructure 312. Using the optical structure of such structure can ensure a normal use of the PIC chip while realizing optical coupling.

Figure 8:
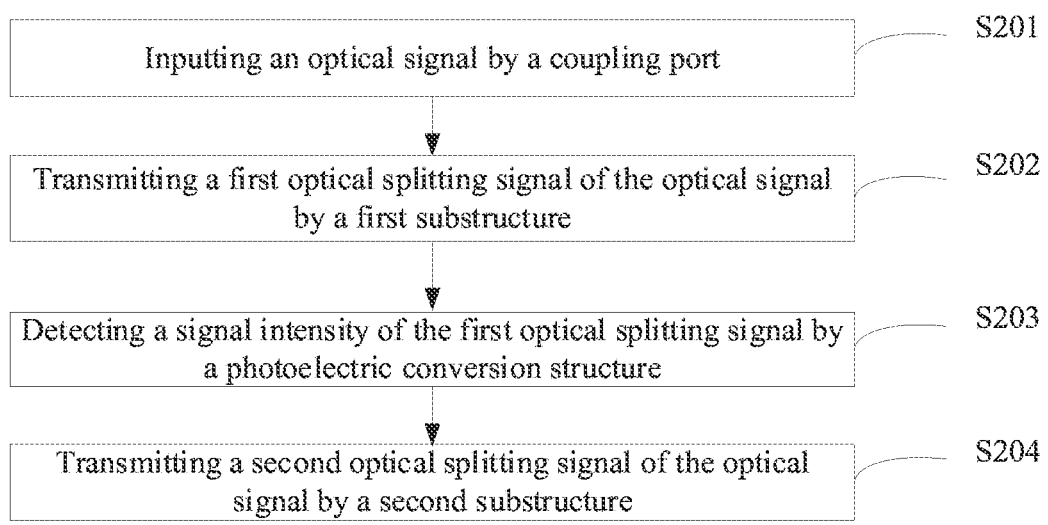
FIG. 8 is a flowchart of another optical coupling method provided by an embodiment of the present invention.

FIG. 8 is a flowchart of another optical coupling method provided in an embodiment of the present invention. The optical coupling method provided by the embodiment of the present invention may be performed by the optical structure provided in the embodiment shown in FIG. 7. The optical structure includes the optical transmission structure 31, and the coupling port 32 and the photoelectric conversion structure 33 both connected to the optical transmission structure 31. The optical transmission structure 31 includes the first substructure 311 and the second substructure 312. The first substructure 311 is connected to the photoelectric conversion structure 33. As shown in FIG. 8, the method may specifically include following steps.

S201, inputting an optical signal by the coupling port;

S202, transmitting a first optical splitting signal of the optical signal by the first substructure;

S203, detecting a signal intensity of the first optical splitting signal by the photoelectric conversion structure; and S204, transmitting a second optical splitting signal of the optical signal by the second substructure.

Based on the embodiment shown in FIG. 7, the optical signal is input into the coupling port 32 of the optical structure, and then an optical splitting processing is performed to obtain the first optical splitting signal and the second optical splitting signal. Optionally, the above-mentioned optical splitting processing can be implemented through the power splitter connected to the coupling port 32. The first substructure 311 transmits the first optical splitting signal, and the second substructure 312 transmits the second optical splitting signal.

In this embodiment, there is no strict timing sequence among steps 202 to 204, and the above is just an example.

Optionally, the plurality of optical structures shown in FIG. 7 can be integrated on the PIC chip. At this time, when the optical signal is input into the coupling port 32 by means of the light source and the prism, and the coupling port 32 and the light source are in one-to-one correspondence, a distance between the coupling ports 32 respectively included in each of the plurality of optical structures should be set to satisfy a certain condition. For example, the distance between the coupling ports 32 is equal to a distance between the light sources corresponding to the coupling ports 32, so as to ensure the optical coupling accuracy of the coupling ports 32.

For contents not described in detail in this embodiment and technical effects that this embodiment can achieve, references may be made to relevant descriptions in the embodiment shown in FIG. 7, and details are not repeated here.

Figure 9:
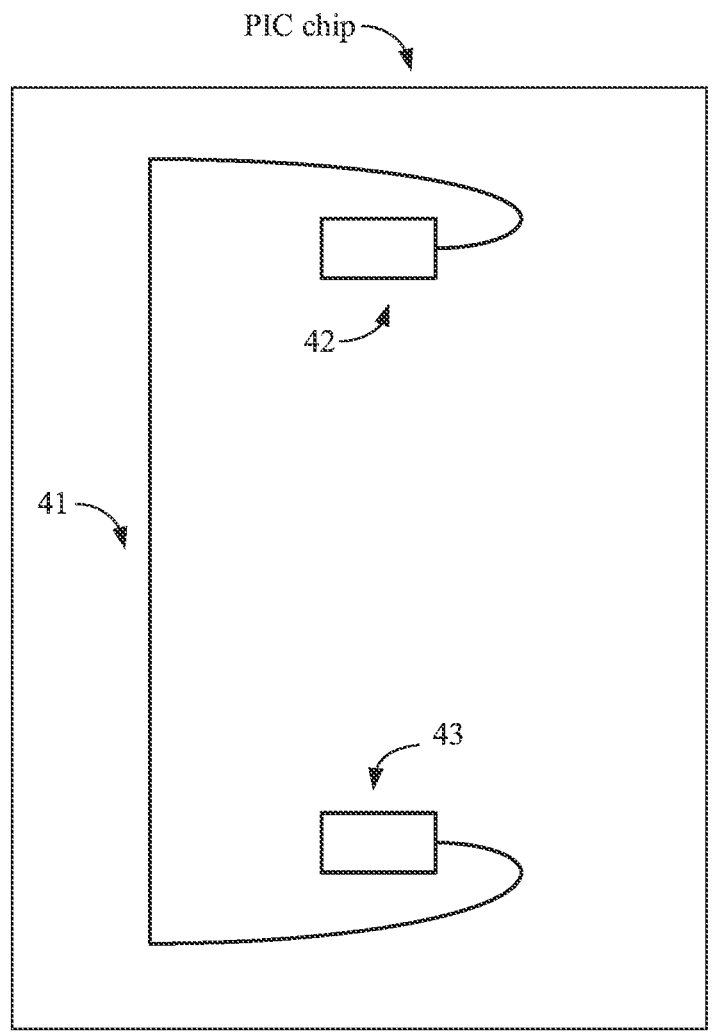
FIG. 9 is a schematic diagram of yet another optical structure provided by an embodiment of the present invention.

FIG. 9 is a schematic diagram of yet another optical structure provided by an embodiment of the present invention. As shown in FIG. 9, the structure includes: an optical transmission structure 41, and a first coupling port 42 and a second coupling port both connected to the optical transmission structure 41.

Optionally, as shown in FIG. 9, the first coupling port 42 and the second coupling port 43 in the optical structure are located at two ends of the optical transmission structure 41, respectively. A process of optical coupling performed by means of the optical structure shown in FIG. 9 can be described as that: the first coupling port 42 is used to input an optical signal, the optical transmission structure 41 is used to transmit the optical signal to the second coupling port 43, and the second coupling port 43 is used to output the optical signal.

Optionally, the optical signal can also be coupled by means of an optical fiber array. That is, the first coupling port 42 is used to input an optical signal transmitted in the optical fiber array, and the second coupling port 43 is used to output the optical signal to the optical fiber array.

Optionally, the optical structure shown in FIG. 9 can also be integrated on a PIC chip, and at least one optical structure shown in FIG. 9 can be integrated on the PIC chip at a same time. Since optical fibers in the optical fiber array are densely distributed, a distance between the first coupling port 41 and the second coupling port 42 in a same optical structure can be relatively small.

In addition, processes not described in detail in this embodiment may refer to relevant descriptions in the embodiments shown in FIG. 1 to FIG. 6, and will not be repeated here.

In this embodiment, the first coupling port 42 in the optical coupling structure is used to input the optical signal, the optical transmission structure 41 is used to transmit the optical signal, and the second coupling port 43 is used to output the optical signal, so as to realize optical signal coupling.

Figure 10:
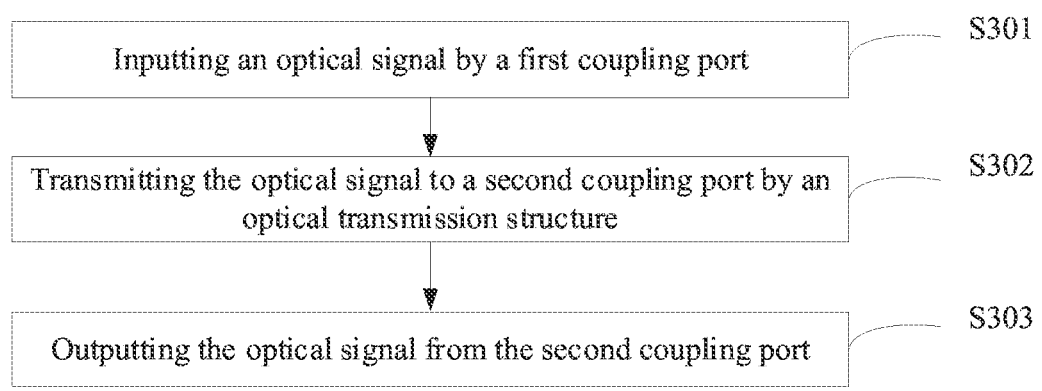
FIG. 10 is a flowchart of yet another optical coupling method provided by an embodiment of the present invention.

FIG. 10 is a flowchart of yet another optical coupling method provided by an embodiment of the present invention. The optical coupling method provided by the embodiment of the present invention may be performed by the optical structure provided in the embodiment shown in FIG. 9. The optical structure includes the optical transmission structure 41, and the first coupling port 42 and the second coupling port 43 both connected to the optical transmission structure 41. As shown in FIG. 10, the method may specifically include following steps.

S301, inputting an optical signal by the first coupling port;

S302, transmitting the optical signal to the second coupling port by the optical transmission structure; and S303, outputting the optical signal from the second coupling port.

Based on the embodiment shown in FIG. 9, the optical signal is input into the first coupling port 42 of the optical structure, then transmitted by the optical transmission structure 41, and finally output by the second coupling port 43, thereby realizing optical signal coupling. Optionally, a detection device externally connected to the optical structure can detect a signal intensity of the optical signal output by the second coupling port 43, so as to determine an optical coupling accuracy of the first coupling port 42 and the second coupling port 43.

Optionally, at least one optical structure shown in FIG. 9 may be integrated on the PIC chip, and the first coupling port 42 and the second coupling port 43 may be located at the two ends of the optical transmission structure 41.

For content that is not described in detail in this embodiment and a technical effect that this embodiment can achieve, reference may be made to relevant descriptions in the embodiment shown in FIG. 9, and details are not repeated here.

In addition, an embodiment of the present invention provides a photonic integrated circuit chip including any of the optical structures provided in FIG. 1, FIG. 3, FIG. 4, FIG. 7, and FIG. 9.

Finally, it should be noted that the above embodiments are merely used to illustrate a technical solution of the present invention, rather than limiting the present invention. Although the present invention has been described in detail with reference to the above embodiments, those skilled in the art should understand that a technical solution recorded in various embodiments as described above may still be modified, or an equivalent replacement may be performed on a part of features therein; however, these modifications and replacements will not make the essence of a corresponding technical solution deviate from the spirit and scope of the technical solution of the various embodiments of the present invention.

What is claimed is:

1. An optical structure, comprising: a first optical coupling structure and a plurality of the second optical coupling structures;
wherein the first optical coupling structure comprises a first optical transmission structure, and a first coupling port and a second coupling port both connected to the first optical transmission structure;
each second optical coupling structure comprises a second optical transmission structure, and a third coupling port and a photoelectric conversion structure both connected to the second optical transmission structure;
the first coupling port is used to input a first optical signal; the third coupling port comprises a grating coupler; the second optical coupling structure further comprises a power splitter connected to the third coupling port and used to perform an optical splitting processing on a second optical signal to obtain a first optical splitting signal and a second optical splitting signal; the second optical transmission structure comprises a first substructure connected to the photoelectric conversion structure, and a second substructure; the first substructure is used to transmit the first optical splitting signal; the photoelectric conversion structure is used to detect a signal intensity of the first optical splitting signal; and the second substructure is used to transmit the second optical splitting signal;
the plurality of the second optical coupling structures comprise a first second optical coupling structure and a second second optical coupling structure; and a distance between the third coupling port included in the first second optical coupling structure and the third coupling port included in the second second optical coupling structure is equal to a preset distance, the preset distance being a distance between light sources respectively corresponding to the third coupling port included in the first second optical coupling structure and the third coupling port included in the second second optical coupling structure.

2. The optical structure as claimed in claim 1, wherein the first optical transmission structure is used to transmit the first optical signal to the second coupling port, and the second coupling port is used to output the first optical signal.

3. The optical structure as claimed in claim 1, wherein the first coupling port is used to input the first optical signal transmitted in an optical fiber array, and the second coupling port is used to output the first optical signal to the optical fiber array.

4. The optical structure as claimed in claim 1, wherein the third coupling port is used to input the second optical signal, the second optical transmission structure is used to transmit the second optical signal.

5. The optical structure as claimed in claim 1, wherein the second optical signal is incident to the third coupling port through a prism.

6. The optical structure as claimed in claim 1, wherein the optical structure is integrated into a photonic integrated circuit chip; the first coupling port and the second coupling port each comprise a grating coupler; and the first optical transmission structure and the second optical transmission structure each comprise a light-guiding medium.

7. An optical coupling method, wherein the optical coupling method is implemented by an optical structure comprising a first optical coupling structure and a plurality of the second optical coupling structures, wherein the first optical coupling structure comprises a first optical transmission structure, and a first coupling port and a second coupling port both connected to the first optical transmission structure; and each second optical coupling structure comprises a second optical transmission structure, and a third coupling port and a photoelectric conversion structure both connected to the second optical transmission structure; and wherein the third coupling port comprises a grating coupler; the second optical transmission structure comprises a first substructure and a second substructure, the first substructure is connected to the photoelectric conversion structure; the plurality of the second optical coupling structures comprise a first second optical coupling structure and a second second optical coupling structure; and a distance between the third coupling port included in the first second optical coupling structure and the third coupling port included in the second second optical coupling structure is equal to a preset distance, the preset distance being a distance between light sources respectively corresponding to the third coupling port included in the first second optical coupling structure and the third coupling port included in the second second optical coupling structure;

the optical coupling method comprising:
inputting an optical signal by the first coupling port;
transmitting the optical signal to the second coupling port by the first optical transmission structure; and
outputting the optical signal from the second coupling port;

and/or:

inputting the optical signal to the third coupling port through the grating coupler;
transmitting a first optical splitting signal of the optical signal by the first substructure, and detecting a signal intensity of the first optical splitting signal by the photoelectric conversion structure; and
transmitting a second optical splitting signal of the optical signal by the second substructure.

8. A photonic integrated circuit chip, comprising an optical structure comprising a first optical coupling structure and a plurality of the second optical coupling structures;
wherein the first optical coupling structure comprises a first optical transmission structure, and a first coupling port and a second coupling port both connected to the first optical transmission structure;
each second optical coupling structure comprises a second optical transmission structure, and a third coupling port and a photoelectric conversion structure both connected to the second optical transmission structure;
the first coupling port is used to input a first optical signal; the third coupling port comprises a grating coupler; the second optical coupling structure further comprises a power splitter connected to the third coupling port and used to perform an optical splitting processing on a second optical signal to obtain a first optical splitting signal and a second optical splitting signal; the second optical transmission structure comprises a first substructure connected to the photoelectric conversion structure, and a second substructure; the first substructure is used to transmit the first optical splitting signal; the photoelectric conversion structure is used to detect a signal intensity of the first optical splitting signal; and the second substructure is used to transmit the second optical splitting signal;
the plurality of the second optical coupling structures comprise a first second optical coupling structure and a second second optical coupling structure; and a distance between the third coupling port included in the first second optical coupling structure and the third coupling port included in the second second optical coupling structure is equal to a preset distance, the preset distance being a distance between light sources respectively corresponding to the third coupling port included in the first second optical coupling structure and the third coupling port included in the second second optical coupling structure.

9. The photonic integrated circuit chip as claimed in claim 8, wherein the first optical transmission structure is used to transmit the first optical signal to the second coupling port, and the second coupling port is used to output the first optical signal.

10. The photonic integrated circuit chip as claimed in claim 8, wherein the first coupling port is used to input the first optical signal transmitted in an optical fiber array, and the second coupling port is used to output the first optical signal to the optical fiber array.

11. The photonic integrated circuit chip as claimed in claim 8, wherein the third coupling port is used to input the second optical signal, the second optical transmission structure is used to transmit the second optical signal.

12. The photonic integrated circuit chip as claimed in claim 8, wherein the optical signal is incident to the third coupling port through a prism.

13. The photonic integrated circuit chip as claimed in claim 8, wherein the optical structure is integrated into a photonic integrated circuit chip; the first coupling port and the second coupling port each comprise a grating coupler; and the first optical transmission structure and the second optical transmission structure each comprise a light-guiding medium.

* * * * *